(No Model.)
W. WELLS.
GOVERNOR FOR SWINGING BERTHS.
No. 279,619. Patented June 19, 1883.
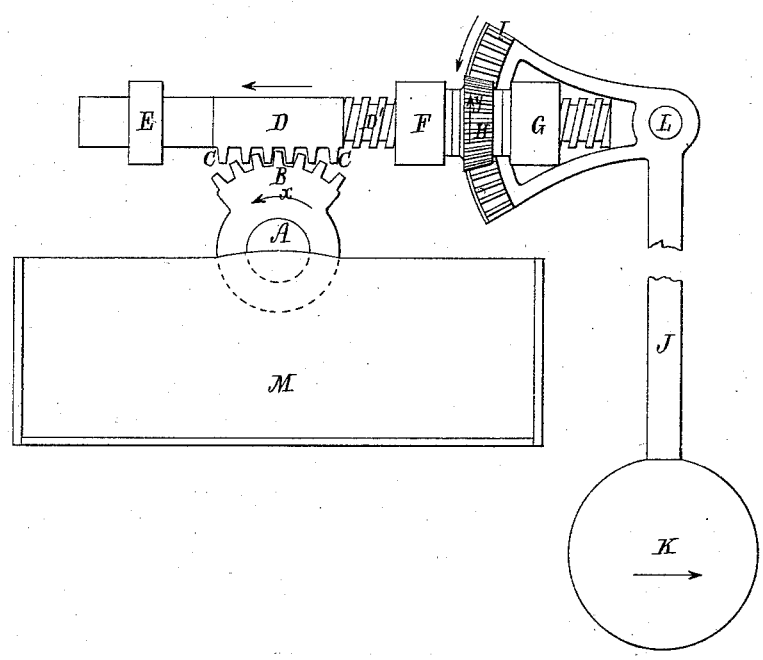
Witnesses
S. N. Piper
E. B. Pratt
Inventor
Webster Wells.
by R. H. Eddy atty.

UNITED STATES PATENT OFFICE.

WEBSTER WELLS, OF WINCHESTER, MASSACHUSETTS, ASSIGNOR, BY MESNE ASSIGNMENTS, TO THE BRUNSWICK SHIP'S BERTH COMPANY, OF CONNECTICUT.

GOVERNOR FOR SWINGING BERTHS.

SPECIFICATION forming part of Letters Patent No. 279,619, dated June 19, 1883.

Application filed September 2, 1882. (No model.)

*To all whom it may concern:*

Be it known that I, WEBSTER WELLS, of Winchester, in the county of Middlesex, of the State of Massachusetts, have invented a new and useful Improvement in Mechanism for Regulating or Controlling the Motions of Berths or various other Articles of Navigable Vessels; and I do hereby declare the same to be described in the following specification and represented in the accompanying drawing, which is a cross-section of a ship's berth with my invention applied thereto.

The nature of my invention is duly defined in the claims hereinafter presented.

The self-leveling article or ship's berth shown at M in the figure is to be supposed to be hung on pivots free to move, under the action of gravity, about a center or axis of a shaft, A. To the moving shaft A is attached a spur-gear sector-gear, B, that engages with a rack, C, projecting from a screw-shaft, D, supported so as to slide lengthwise in guides E F G, which are to be supposed to be fastened securely to a bulk-head or other suitable portion of a navigable vessel. H is a bevel-gear adapted to the screw of the shaft D and kept in place by and between the guides F G. This bevel-gear engages with a bevel-gear sector I, having a supporting-shaft at L. To this bevel-gear sector I is attached a pendulum, J, whose weight is shown at K, the parts being so arranged that the motion of the pendulum in swaying back and forth shall, by the gear-sector, be communicated to the bevel-gear nut H to revolve it on the screw D' of the shaft D.

The operation of the apparatus may be thus described: The motion of the vessel would cause the berth or self-leveling article to vibrate were it not for the gravitating power and action of the pendulum. Suppose, for example, the motion of the vessel to be such as to tip the berth in either direction. The pendulum, by maintaining its upright position while the vessel may be "rolling," will, by means of the mechanism intervening between it and the worm-shaft, revolve the latter with its worm, so as to allow the berth to maintain its level, the berth in the meantime being held so that it cannot be tipped out of level by a person or weight tending to cause it to so move.

The object of the device may be thus explained: Were the article or berth simply hinged at A with no means of controlling its motions, it would, if once set in a swinging motion by a lurch of the ship, continue to sway back and forth unnecessarily. This swaying motion, were the article a berth, would be very disagreeable. Again, in the case of a berth, were a person's weight brought on one side of it, as would occur in the act of getting in or out of it, the berth would be thrown out of its proper level, much to the inconvenience of the occupant. My invention prevents all this, for no matter how much weight is brought to bear on the edge, side, or end of the berth such berth can not be moved out of its horizontal position unless the worm be revolved, which can take place only when the vessel may be in motion, the pendulum in the meantime keeping its normal or vertical position. When the vessel is rolling, the pendulum, under the action of gravity, indirectly causes the worm to easily revolve in order for the berth to maintain its level, the worm and berth toothed sector operating to prevent the berth from being in the meantime tipped by a person in the berth.

The above-described mechanism can be applied to self-leveling ship-berths, cattle-stalls, or various kinds of ship-furniture, &c.—in fact, to almost any article on board a ship or vessel which it may be desirable generally, if not at all times, to maintain a level position.

The rotating shaft A is regulated and controlled by means of a pendulum, J, the connection being made by the mechanical principle of the screw, which enables the pendulum to control the movements of the self-leveling article, while the self-leveling article is powerless to affect the motions of the pendulum, but must conform its own motions to those of the latter.

I do not claim the combination of worms or screws with berths for the purpose and in the manner as shown and described in the United States Patent No. 260,911.

What I claim as my invention, and desire to secure by Letters Patent, is as follows, viz:

1. The combination of the self-leveling article or berth, the pendulum, the two sectorgears, the rack, the bevel-gear, and the screw-shaft, arranged and adapted substantially as set forth.

2. The combination of a self-leveling berth and a toothed sector, B, adapted to the shaft A or axis of vibration of such berth, with a pendulum, J, having a toothed sector, I, extended from it, as described, a screw-shaft, D, provided with a gear, H, to engage with the pendulum-sector, and with a rack, C, engaged with the sector B, all being substantially and to operate as set forth.

WEBSTER WELLS.

Witnesses:
R. H. EDDY,
E. B. PRATT.